(12) United States Patent
Gilleran et al.

(10) Patent No.: US 9,085,358 B2
(45) Date of Patent: Jul. 21, 2015

(54) ELECTRIC MOTOR INTEGRATED WITH A WHEEL

(75) Inventors: Neal Gilleran, Long Beach, CA (US); Robert M. Sweet, Beaver, UT (US); Jonathan Sidney Edelson, North Plains, OR (US); Rodney T. Cox, North Plains, OR (US); Isaiah Watas Cox, Baltimore, MD (US)

(73) Assignee: Borealis Technical Limited, Gilbraltar (GI)

( * ) Notice: Subject to any disclaimer, the term of this patent is extended or adjusted under 35 U.S.C. 154(b) by 369 days.

(21) Appl. No.: 13/050,838

(22) Filed: Mar. 17, 2011

(65) Prior Publication Data

US 2012/0001018 A1    Jan. 5, 2012

Related U.S. Application Data

(60) Provisional application No. 61/340,518, filed on Mar. 17, 2010.

(51) Int. Cl.
*B64C 25/40* (2006.01)
*H02K 7/14* (2006.01)

(52) U.S. Cl.
CPC ............... *B64C 25/405* (2013.01); *H02K 7/14* (2013.01); *Y02T 50/823* (2013.01)

(58) Field of Classification Search
CPC ...... B64C 25/405; B64C 25/50; B64C 25/34; B64C 25/36; Y02T 50/823
USPC ............................. 244/50, 111, 103 S, 103 R
See application file for complete search history.

(56) References Cited

U.S. PATENT DOCUMENTS

| | | | |
|---|---|---|---|
| 1,531,588 A * | 3/1925 | Williams, Jr. ............. 244/103 R |
| 2,408,163 A * | 9/1946 | Fodor ......................... 244/103 S |
| 2,425,583 A * | 8/1947 | Volk ........................... 244/103 S |
| 2,430,163 A * | 11/1947 | Dever ......................... 310/67 R |
| 2,457,144 A * | 12/1948 | Goodale ...................... 65/59.24 |
| 2,935,278 A * | 5/1960 | Lesley ...................... 244/103 R |
| 3,977,631 A | 8/1976 | Jenny |
| 5,190,247 A * | 3/1993 | Le Chatelier ............. 244/103 R |
| 5,633,544 A * | 5/1997 | Toida et al. ................. 310/67 R |
| 5,926,017 A * | 7/1999 | Von Grunberg et al. ...... 324/166 |
| 7,226,018 B2 * | 6/2007 | Sullivan ........................ 244/111 |
| 7,445,178 B2 * | 11/2008 | McCoskey et al. ............. 244/50 |
| 2006/0273686 A1* | 12/2006 | Edelson et al. ............... 310/266 |
| 2007/0158497 A1* | 7/2007 | Edelson et al. ............. 244/103 S |
| 2007/0282491 A1* | 12/2007 | Cox et al. ........................... 701/3 |
| 2009/0152055 A1* | 6/2009 | Cox .............................. 188/71.6 |
| 2009/0186535 A1* | 7/2009 | Sullivan ............................ 440/6 |
| 2009/0261197 A1* | 10/2009 | Cox et al. ......................... 244/50 |
| 2010/0276535 A1* | 11/2010 | Charuel et al. ................... 244/50 |
| 2010/0288873 A1* | 11/2010 | Cox et al. ......................... 244/50 |

FOREIGN PATENT DOCUMENTS

GB            2457144            8/2009
WO     WO2008027458            6/2008

* cited by examiner

*Primary Examiner* — Valentina Xavier

(57) ABSTRACT

An integral motor and wheel assembly for aircraft landing gear is provided that includes an electric motor packaged within at least one gear wheel and configured to fit completely within the space provided in an existing aircraft for the landing gear components. The motor is positioned within the wheel to minimize the spin-up weight and to maximize the space within a given volume allocated for the motor. Installation of this motor and gear wheel assembly in an existing aircraft landing gear is designed to permit the continued use of existing landing gear components, including tires, axles, and pistons, so that the assembly can be easily retrofitted into existing aircraft.

14 Claims, 2 Drawing Sheets

ELECTRIC MOTOR INTEGRATED WITH A WHEEL

This application is based on and claims priority from U.S. Provisional Patent Application No. 61/340,518, filed 17 Mar. 2010, the disclosure of which is fully incorporated herein.

TECHNICAL FIELD

The present invention relates generally to motor structures that can be mounted integrally within a wheel structure and, specifically, to an electric motor designed to be mounted within an aircraft wheel to drive the aircraft wheel.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gates areas has become increasingly important. As airline fuel costs and safety concerns and regulations have increased, use of the aircraft main engines is no longer the best option for achieving the desired safe and efficient ground movement.

Various alternatives to the use of an aircraft's main engines to move an aircraft on the ground have been tried. The use of a tug or tow vehicle to move an aircraft into and out of a gate or parking location can eliminate the need to use the aircraft main engines. This option, however, is not without its own challenges and costs. More ground vehicles requiring more fuel and more ground personnel to operate them, add to an already congested environment in the gate area. Restricted use of the aircraft engines on low power during arrival at or departure from a gate is an additional option. This option is also problematic. Not only does engine use consume fuel, it is also noisy, and the associated safety hazards of jet blast and engine ingestion in a congested area are significant concerns that cannot be overlooked.

The use of a motor structure integrally mounted with a wheel to rotate the wheel and drive a vehicle, including an aircraft, has been proposed. The use of such a structure, ideally, could move an aircraft with minimal or no use of an aircraft's main engines. In U.S. Pat. No. 2,430,163, for example, Dever describes a motor that may be incorporated in an aircraft landing gear wheel in which the stator is mounted on a stationary part of a wheel assembly and the rotor is connected to the revolving part of the wheel to produce a high rotating torque near the periphery of the wheel. The structure described by Dever, while likely to have been suitable for World War II era aircraft, is not likely to be as effective in the gear wheels of contemporary aircraft. Other patent art, such as U.S. Pat. No. 3,977,631 to Jenny, also describe drive motors associated with aircraft gear wheels intended to drive an aircraft on the ground. The motor assembly disclosed by Jenny is selectively coupled to an aircraft wheel through a rotatably mounted brake apparatus in which the normally non-rotating stator is rotatably mounted and driven. In U.S. Pat. No. 7,445,178, McCoskey et al describe a powered nose aircraft wheel system with a multifunctional wheel motor coupled to the wheel axle and the wheel. A dual cone clutch structure is required to be actuated to allow the wheel motor to spin the wheel freely prior to landing and to change the direction of wheel rotation from forward to reverse. U.S. Pat. No. 7,226,018 to Sullivan also describes a wheel motor useful in an aircraft landing gear wheel. This wheel hub motor/generator disks stack includes within the stack alternating rotor and stator disks and is designed to provide motive force to an aircraft wheel when electric power is applied. The arrangement is stated to function as a unique aircraft braking system that also converts kinetic energy into electrical energy. None of the foregoing patents suggests a compact motor assembly capable of powering an aircraft drive wheel that could be easily installed in the limited landing gear space available on an existing aircraft without substantial modification. This art, moreover, does not contemplate an integral configuration of the motor components that sheds heat during operation and that provides easy access to the motor components for maintenance and repair when the motor is not in operation.

Published U.S. patent applications, including U.S. Patent Application Publication Nos. US2006/0273686 to Edelson, US2007/0282491 to Cox et al, US2009/0152055 to Cox, US2009/0261197 to Cox, International Patent Application Publication No. WO 2008/027458 to Cox et al, and British Patent No. 2457144, owned in common with the present invention, describe aircraft drive systems that use electric drive motors to power aircraft wheels and move an aircraft on the ground. These disclosures focus on specific aspects of the drive systems and motor assemblies, including drive system data, motor design, tire profile, and motor cooling, rather than on integrally configuring motor components with landing gear wheel components to maximize the available space without changes to the aircraft landing gear.

A need exists, therefore, for an electric motor assembly for an aircraft gear wheel designed to fit integrally within the aircraft wheel and efficiently with other existing components into the limited space available for the aircraft landing gear without changes to the existing components.

SUMMARY OF THE INVENTION

It is a primary object of the present invention, therefore, to provide an electric motor assembly for an aircraft gear wheel designed to fit integrally within the aircraft wheel and efficiently with other existing components into the limited space available for the aircraft landing gear without changes to the existing components.

It is another object of the present invention to provide an electric motor integrated with an aircraft gear wheel that does not require replacement of the aircraft's existing axle, wheel, tires, piston, or other landing gear components.

It is an additional object of the present invention to provide an electric motor integrated with an aircraft gear wheel that does not require change or re-certification for the aircraft's wheel rim width, tire bead, or bead seat.

It is a further object of the present invention to provide an electric motor integrated with an aircraft gear wheel assembly that minimizes spin-up weight and maximizes the space available within the landing gear for installation of the motor.

It is yet another object of the present invention to provide an electric motor integrated with an aircraft gear wheel that provides a solid thermal connection between the motor and the wheel axle and landing gear piston to facilitate heat dissipation from the motor and wheel assembly.

It is yet a further object of the present invention to provide an electric motor and aircraft gear wheel assembly that provides easy access to motor components for maintenance or repair after installation of the assembly.

In accordance with the aforesaid objects, an electric motor is integrally incorporated into an aircraft gear wheel to enable the aircraft gear wheel to be driven on the ground independently of the aircraft main engines. The electric motor is designed and sized to fit in the space available in an existing aircraft landing gear without changing the existing landing gear components so that the motor powers not only the wheel within which it is installed to drive the aircraft, but also provides the wheel support. Alternate electric motor configurations in combination with different bearing arrangements may be employed to provide structural support and drive power for the wheel. A mechanical connection from the motor to a non-rotating landing gear component is preferably included to provide for a torque reaction. Maintenance, such as tire changes, and service of the motor is much simplified by the configuration of the electric motor and gear wheel assembly of the present invention.

Other objects and advantages will be apparent from the following description, drawings, and claims.

DETAILED DESCRIPTION OF THE INVENTION

The many advantages of being able to drive an aircraft on the ground independently without using the aircraft main engines, as discussed above, have been acknowledged. Integrating a motor with an aircraft gear wheel as the aircraft is being constructed does not present problems because the space available for landing gear components, including motors for driving gear wheels, can be adjusted, as required. Retrofitting existing aircraft presents challenges, however. The integral electric motor and gear wheel assembly of the present invention overcomes these challenges and provides a motor and gear wheel assembly that can be fitted into the limited space available for aircraft landing gear components without modifying any of the other landing gear components. As a result, an aircraft's existing gear wheel, the wheel well, tire, axle, piston, and other landing gear components can be used with the present integrated motor and wheel assembly. The motor and gear wheel assembly of the present invention makes it possible to retrofit existing aircraft simply and effectively so that these older aircraft can achieve the fuel and cost savings and other advantages of aircraft ground movement that is independent of the aircraft engines and external ground vehicles.

Since landing gears on existing aircraft are already completely designed to function without additional components like electric drive motors, there is not much space available for a motor, a clutch, if required, electrical connections, or other structures. Modifications that require changes to the axle or piston, which have been suggested, would be expensive and time consuming, in large part because any changes from existing structure would require re-certification by regulatory authorities such as the United States Federal Aviation Administration (FAA) and equivalent international regulatory authorities.

Figure 1:
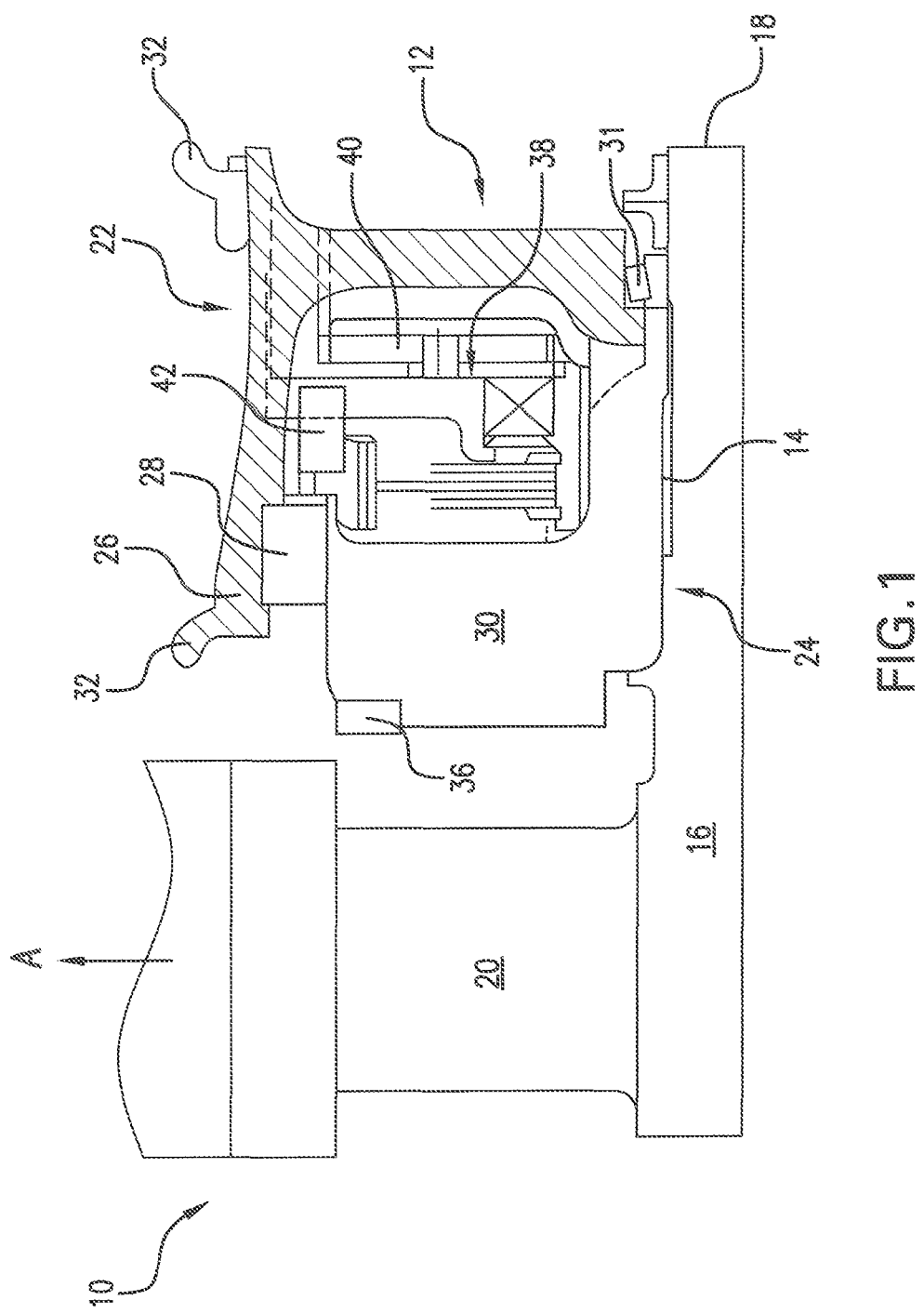
FIG. 1 is a diagrammatic illustration of one possible arrangement of an electric motor within an aircraft gear wheel according to the present invention.

Referring to the drawings, FIG. 1 illustrates, diagrammatically, one possible arrangement of components in an integral electric motor and gear wheel assembly 10 according to the present invention that can be retrofitted in an existing aircraft landing gear. The arrow A indicates the orientation of the motor and wheel assembly with respect to the aircraft body, which would be in the direction of arrow A. In this arrangement, a section 14 of the wheel 12 along the axle 16 that extends toward an axle cap 18 retains the configuration of a conventional wheel. Piston 20 is associated with the landing gear extension and retraction apparatus (not shown). A second section 22 of the wheel 12, opposite wheel section 14, is supported by the motor 24.

An upper section 26 of the wheel 12 is supported by a bearing 28 that rests on a stationary part of the motor 24, such as the motor stator 30, a motor housing (not shown), or an equivalent stationary component capable of supporting the wheel. A stator support bearing 31 may be located between the motor 24 and the axle 16. A gear wheel tire (not shown) will be mounted on a tire flange 32. The motor 24 includes a mechanical connection through a torque arm 36 to a non-rotating landing gear component, such as a tow bar or tow jack fitting (not shown), to provide for a torque reaction.

The motor 24 preferably includes a stator 30 and a rotor 38. Optionally gears, such as gears 40, and a clutch, such as the clutch 42, can be provided. Gears and clutch assemblies intended to function in electric motors are known. Appropriate gear and clutch structures can be selected to provide operative connections between the wheel and rotating parts of the motor.

The motor and wheel assembly 10 is shown only on one side of the aircraft axle 16. The structures on the opposite side of the axle 16 will mirror those shown and described. In addition, a portion of only one wheel is shown. Most commercial aircraft main gear and nose gear assemblies include pairs of wheels. The motor and gear wheel assembly of the present invention can be effectively installed on a single gear wheel or on multiple gear wheels.

Figure 2:
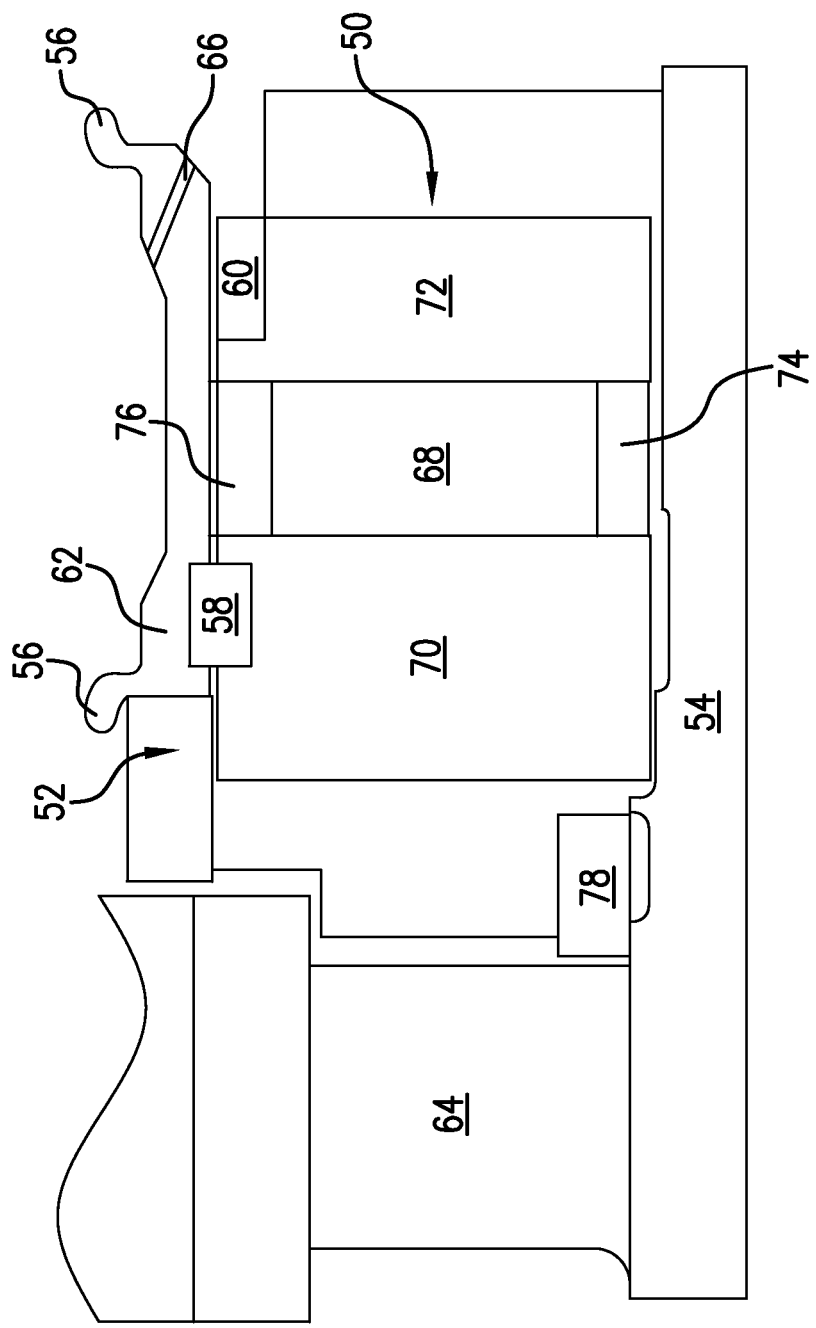
FIG. 2 illustrates schematically another possible arrangement of an electric motor within an aircraft gear wheel according to the present invention.

FIG. 2 is a schematic illustration of a second possible arrangement of an integrated electric motor and aircraft gear wheel according to the present invention. In this arrangement, the motor 50 provides the structural support for the entire wheel 52, which is located between the landing gear axle 54 and the tire flange 56. A pair of bearings 58, 60 is positioned near the tire bead 62 between the wheel 52 and the motor 50. Bearing 58, the inner bearing, supports the section of wheel 52 closest to the landing gear piston 64, and bearing 60, the outer bearing, supports the section of the wheel 52 farthest away from the piston 64. A conduit 66 is provided near the inner bearing 60 in the tire bead 62 and is sized to accommodate a tire valve stem (not shown), which facilitates access to the tire valve for checking tire inflation and air pressure and adding air when needed. The valve stem can be accessed from outside the wheel without interfering with the motor components.

In the FIG. 2 embodiment, the motor 50 forms the wheel support, and both bearings 58 and 60 are located away from the axle 54, in contrast to the embodiment shown in FIG. 1, in which only one bearing 28 is required. In FIG. 2, the motor rotor 68 is preferably located between two stator pieces 70, 72 that form the mechanical supports for the wheel 52. The rotor 68 is preferably sandwiched between the stator pieces 70, 72 at or near the centerline of the tire rim width, and a clutch 76 forms an interface with the remaining section of the wheel 52.

The wheel 52 is preferably bolted at one or more locations (not shown) on one or both of the stator pieces 70, 72. A bearing 74 that also functions as a stator support is positioned between the rotor 68 and the axle 54. As in the FIG. 1 arrangement, the motor 50 includes a mechanical connection to a torque arm 78 that is preferably attached to a non-rotating landing gear component, such as a tow bar or tow jack fitting (not shown), to provide for a torque reaction. As in FIG. 1, the motor and wheel assembly is shown on only one side of the aircraft axle 54. The structures on the opposite side of the axle 54 will mirror those shown and described.

An electric motor preferred for use with the integral motor and gear wheel assembly of the present invention could be any of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use in the present invention.

The electric motor selected should be able to move an aircraft gear wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving a gear wheel to move an aircraft on the ground, including but not limited to electric induction motors, permanent magnet brushless DC motors, and switched reluctance motors may also be used. Other motor designs capable of high torque operation across the desired speed range that can be integrated into an aircraft wheel to function as described herein may also be suitable for use in the present invention.

The integral motor and aircraft wheel assembly described above presents significant advantages over known motor and aircraft wheel assemblies. The motor selected for use with this assembly will preferably be sufficiently compact to fit in the available space in an aircraft landing gear assembly and will have a mass that is as low as functionally possible. As a result, spin up loads for the wheel are minimized by removing considerable motor mass. In addition, the present invention allows the motor to spin up and match wheel speed before a clutch is engaged. The effect of this is to permit the electric drive motor to connect or disconnect as required, eliminating the need to bring the aircraft to a stop before the assembly is engaged or disengaged.

Not only is the motor and wheel assembly of the present invention designed to be easily installed in existing aircraft, but service and maintenance tasks are made easier by this design. Existing landing gear aircraft tires, axles, and pistons can be reused, which means that the tire rim width, tire bead, and bead seat do not have to be changed or re-certificated by the FAA, a potentially time consuming and costly process. Additionally, the incorporation of the motor within the aircraft wheel greatly simplifies routine maintenance and service. Access to motor components, such as the rotor and bearings (34 and 28, respectively in FIGS. 1 and 68 and 58, 60, respectively in FIG. 2), is gained by removing the wheel. Servicing of the assembly, moreover, does not require disconnection of the electrical connections (not shown) between the motor (24 in FIGS. 1 and 50 in FIG. 2) and a wire harness (not shown) that leads into the aircraft fuselage. Changing an aircraft tire is easier with the present motor and wheel assembly than with available aircraft motor and wheel assemblies because the motor does not have to be removed from the aircraft. The use of a low profile tire in the integral motor and wheel assembly of the present invention, such as that disclosed in International Patent Application No. WO 2008/ 027458, the disclosure of which is incorporated herein by reference, can provide additional space inside the wheel for the motor.

The amount of wheel mass required to be removed from the aircraft is reduced considerably because the bulk of the inside wheel well would be motor mass that can stay connected to the aircraft. Finally, the present motor assembly can be more easily sealed from environmental contaminants such as water, ice, snow, and corrosive chemicals commonly used at airports, including de-icing fluids, hydraulic fluids, and the like, thereby increasing the useful life of the motor and related components.

It can be seen in FIGS. 1 and 2 that a solid thermal connection between the motor (24, 50) and the axle (16, 54) and piston (20, 64) and associated hardware (not shown) is provided. This connection enables heat to be shed or dissipated through these large metallic components without requiring additional structures or methods. Other arrangements for dissipating heat in a motor-driven aircraft gear wheel could also be used to enhance the heat dissipation by the thermal connection. An example of a system that can be employed effectively to cool wheel motors is described in U.S. Patent Application Publication No. US2009/0152055, which is incorporated herein by reference. This system includes providing a rotor with fan-shaped projections or, alternatively, holes or tunnels, in connection with a fan, to conduct warm air from inside the motor and wheel assembly to the outside.

The motor and gear wheel assembly of the present invention has been described in connection with a single aircraft gear wheel. This assembly can also be used simultaneously on more than one aircraft wheel, including one or more of the nose wheel or the other aircraft wheels.

While the present invention has been described with respect to preferred embodiments, this is not intended to be limiting, and other arrangements and structures that perform the required functions are contemplated to be within the scope of the present invention.

Industrial Applicability

The present invention will find its primary applicability in retrofitting existing aircraft landing gear and gear wheels with the integral electric drive motor and wheel assembly of the present invention when it is desired to obtain the advantages of the capability for moving an aircraft on the ground independently of the aircraft main engines or external tow vehicles.

The invention claimed is:

1. An electric drive motor assembly designed to be integrated into a landing gear wheel in an existing aircraft, comprising
   a. an electric drive motor capable of driving a landing gear wheel to move an aircraft on a ground surface without aircraft main engines, wherein the drive motor comprises a rotor element and one or more stator elements designed and sized to fit coaxially on a landing gear wheel axle completely within space available within an existing aircraft landing gear wheel without changing existing landing gear components, with at least one stator element proximal to a landing gear piston and said rotor element distal to said landing gear piston; and
   b. a landing gear wheel comprising at least a tire-supporting wheel section positioned relative to said at least one stator element so that said at least one stator element form a support element that mechanically supports at least said tire-supporting wheel section, wherein one or more support bearings are positioned in supporting contact between said tire-supporting wheel section and said one or more stator elements to support at least said tire-contacting wheel section or said entire landing gear wheel.

2. The assembly described in claim 1, wherein said landing gear wheel is an aircraft nose wheel.

3. The assembly described in claim 1, wherein said electric drive motor is equipped with a gear assembly adapted to provide a driving connection between components of said drive motor and a clutch connecting said wheel with said drive motor or with said gear assembly.

4. The assembly described in claim 1, wherein said electric drive motor rotor element or said one or more stator elements is adapted to mechanically support the entire landing gear wheel.

5. The assembly described in claim 1, wherein said electric drive motor comprises an electric motor capable of driving an aircraft landing gear wheel to move an aircraft on the ground without aircraft main engines comprising an axial flux motor, a toroidally wound motor, an electric induction motor, a permanent magnet brushless DC motor, or a switched reluctance motor.

6. The assembly described in claim 4, wherein said electric drive motor comprises a rotor element positioned between two stator elements and each of said support bearing.

7. The assembly described in claim 1, wherein said tire-supporting wheel section includes a conduit adapted to easily access a valve of a tire mounted on the landing gear wheel.

8. The assembly described in claim 1, wherein location of the electric drive motor supporting said tire-supporting wheel section is selected to produce a solid thermal connection between said one or more stator elements and one or more aircraft landing gear components, whereby heat is directed out of said assembly.

9. The assembly described in claim 7, further comprising a tire rotationally mounted on said tire-supporting wheel section, and said tire includes a valve with a valve stem in said conduit in fluid communication with said tire through said valve, whereby air can be put into the tire, and said tire-supporting wheel section is located at a location that is easily accessed from outside the landing gear.

10. The assembly described in claim 6, wherein said tire-supporting wheel section comprises a tire rim and said one or more bearings are positioned between each of said stator elements and the tire rim to support said wheel tire rim.

11. The assembly described in claim 10, wherein said rotor element is positioned at or near the center of said tire rim.

12. The assembly described in claim 1, wherein said electric drive motor is mechanically connected to a non-rotating component of said landing gear to provide for a torque reaction.

13. An integral electric drive motor and aircraft nose landing gear wheel assembly configured to be retrofitted within space provided for landing gear components of an existing aircraft nose wheel without changing landing gear components, wherein the assembly comprises an electric drive motor comprising at least a stator and a rotor located coaxially on a landing gear wheel axle with the stator proximal to a landing gear piston and the rotor distal to said stator and said landing gear piston, wherein said stator is configured and positioned to provide mechanical support for a tire-supporting wheel section of said nose landing gear wheel through at least one support bearing element positioned to contact said stator and said tire-supporting wheel section at a location between said stator and said tire-supporting wheel section selected to mechanically support said tire-supporting wheel section.

14. An integral electric drive motor and aircraft nose landing gear wheel assembly configured to be retrofitted within space provided for landing gear components of an existing aircraft nose wheel without changing landing gear components, wherein the assembly comprises an electric drive motor comprising a pair of stators and a rotor located coaxially on a landing gear wheel axle, wherein one of said pair of stators is located proximal to a landing gear piston and the other of said pair of stators is located distal to said landing gear piston and said pair of stators and said rotor are arranged on said landing gear wheel axle so that said rotor is positioned centrally between each one of said pair of stators; and each one of a pair of spaced bearing support elements is located in supporting contact between a tire-supporting wheel section in said nose landing gear wheel and one of said pair of stators, thereby providing mechanical support for said entire nose wheel.

* * * * *